Nov. 23, 1926.

W. C. STEVENS 1,608,192

TIRE MACHINE AND FABRIC FEEDING MECHANISM

Filed Dec. 9, 1919    5 Sheets-Sheet 3

Nov. 23, 1926.

W. C. STEVENS 1,608,192

TIRE MACHINE AND FABRIC FEEDING MECHANISM

Filed Dec. 9, 1919    5 Sheets-Sheet 4

Witness:

Inventor:
William C. Stevens

Nov. 23, 1926.  
W. C. STEVENS  
1,608,192  
TIRE MACHINE AND FABRIC FEEDING MECHANISM  
Filed Dec. 9, 1919  5 Sheets-Sheet 5

Witness:  
Inventor:  
William C. Stevens

Patented Nov. 23, 1926.

1,608,192

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE MACHINE AND FABRIC-FEEDING MECHANISM.

Application filed December 9, 1919. Serial No. 343,541.

This invention relates to the art of manufacturing tire casings or carcasses of superposed layers of rubberized fabric and is specifically an improvement on a machine for manufacturing tire casings as shown in my application, Serial No. 256,429, filed October 1, 1918, Patent No. 1,557,891, October 20, 1925. This invention has to do with the devices in use for feeding the fabric to the tire machine, and is designed to improve upon the methods therein shown, and as such is an improvement on my Patent No. 1,398,749, issued November 29, 1921, and my prior application Serial No. 262,495, filed November 14, 1918, Patent No. 1,536,459, May 5, 1925.

A full description of the advantages in the improved method of feeding fabric to tire building machines is set forth in the last two applications named, and I will not enter into them further at this time than to say that by means of feeding mechanism for leading the fabric direct from the table where it is assembled in lengths from bias strips, the fabric is delivered fresher and the workman is enabled to more efficiently handle it than by methods previously known. The improvement herein shown and described is superior to the devices shown in my prior application in that the fabric is fed from assembling tables on the same floor as the tire building machines and belts or other conveying means are provided for conducting the fabric so that pull is not exerted on it, an action which has led to overstretching of the fabric on its way to the machine. Also there is provided a motor whereby the fabric is positively fed and the feeding takes place without supervision on the part of the operator, there being always present in the machine enough fabric to make the required number of turns around the core.

The description of the apparatus shown herein is for the purpose of disclosure only and it is understood that the invention is not limited to this form alone, as many different embodiments of it may be devised, and such as are within the scope of this invention are intended to be covered hereby.

Figure 1:
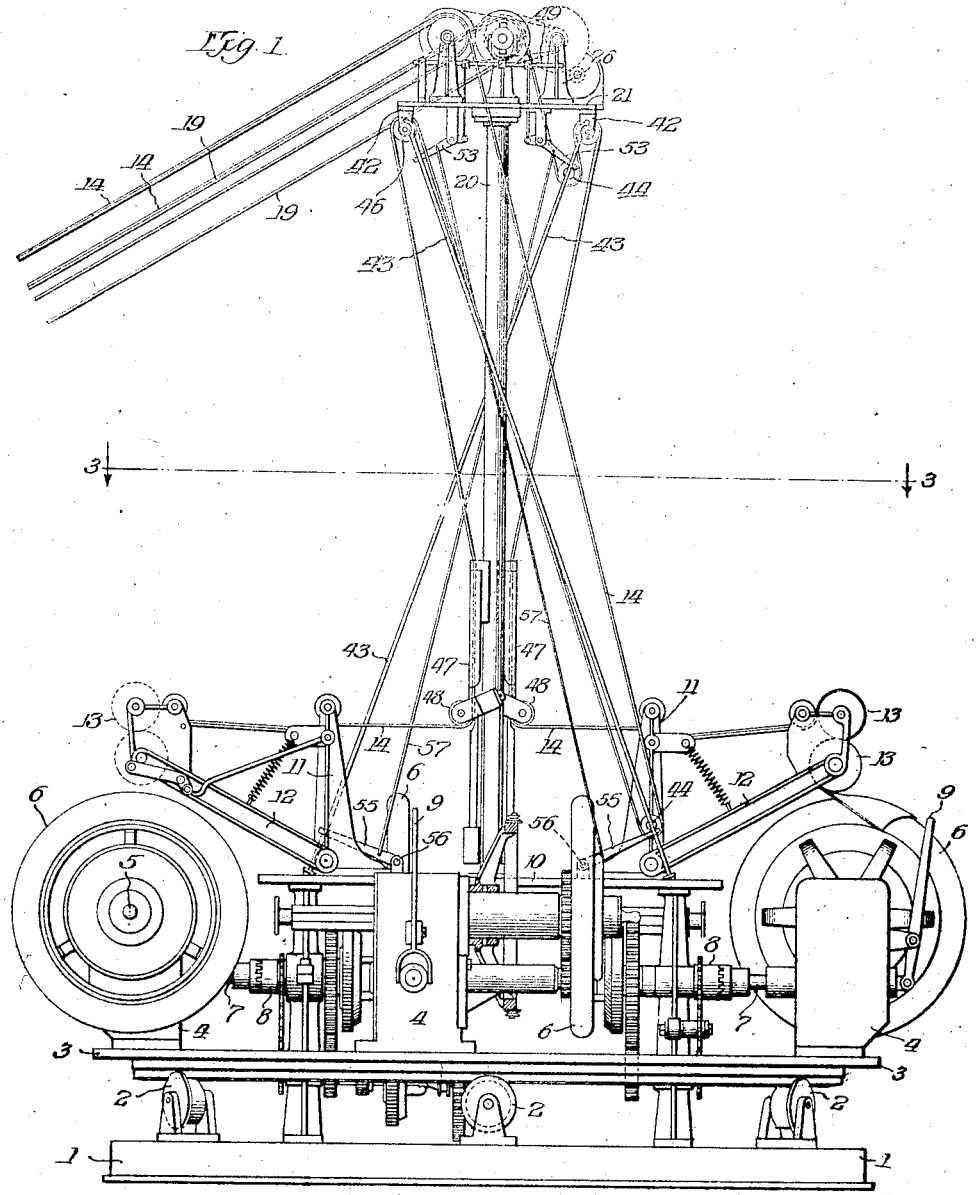
Fig. 1 is a side elevation of the tire building machine with the fabric feeding mechanism mounted thereon.
Figure 2:
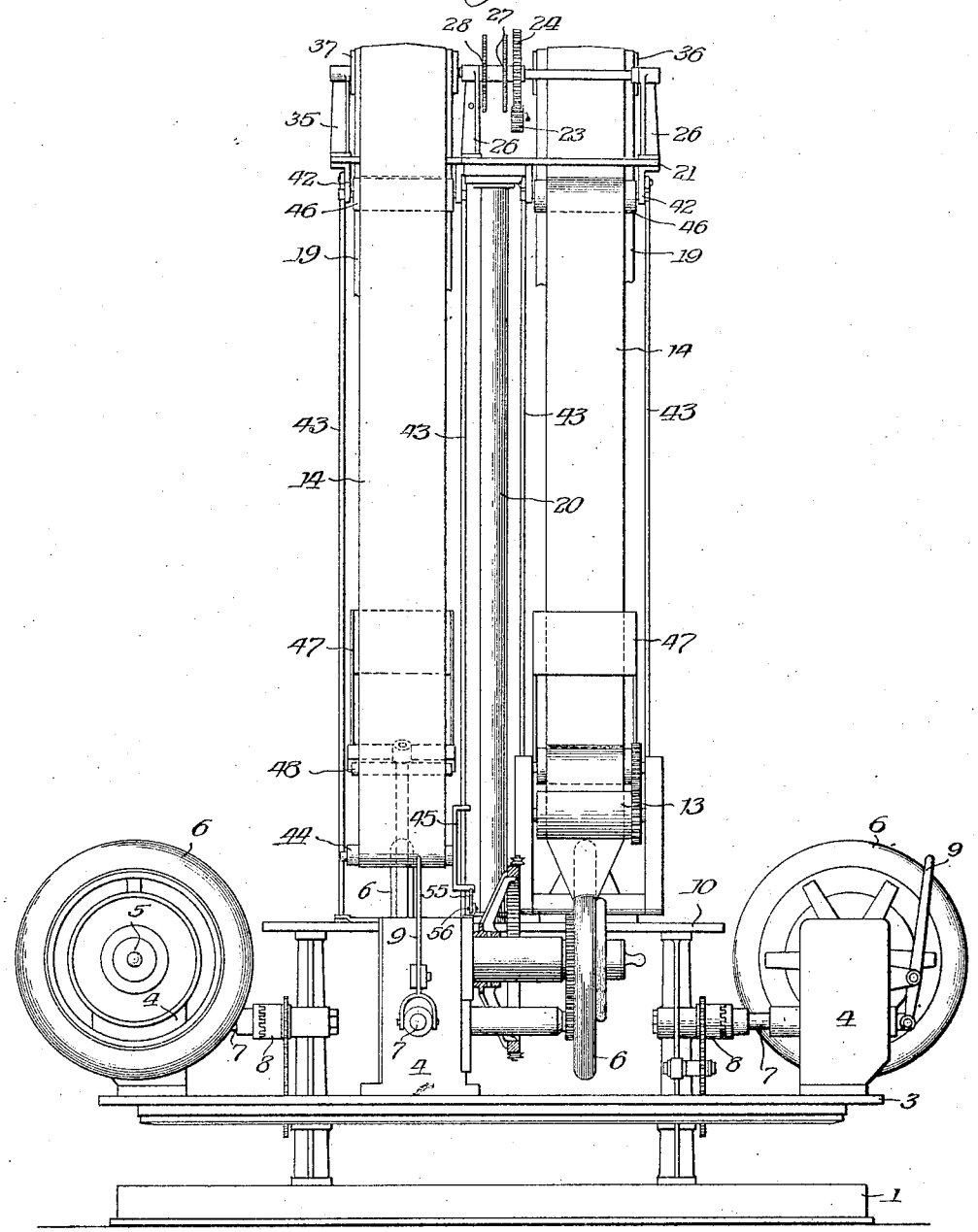
Fig. 2 is an elevation at right angles to Fig. 1.

In the drawings, there is shown one type of tire making machine which may form a part of this invention, although it is understood that any suitable type of mechanism may be employed for shaping or smoothing the fabric about the core. The particular form of machine herein shown is that forming the subject matter of my application aforementioned, Serial No. 256,429, and in this description the construction and operation of the machine will not be entered into further than is necessary for a full understanding of the invention.

The tire machine comprises a base plate 1 on which is supported by means of flanged rollers 2 a rotatable annular turntable 3. This turntable carries a plurality of stanchions or uprights 4, which carry shafts 5 on which are supported tire building cores 6. In the machine herein shown, the building of the tire is divided into four operations and for this reason the turntable carries four cores and core supports and the different operations of building are performed on the several cores at the same time, the turntable being revolved a quarter of the way at each step in order to advance the core through the machine.

Figure 3:
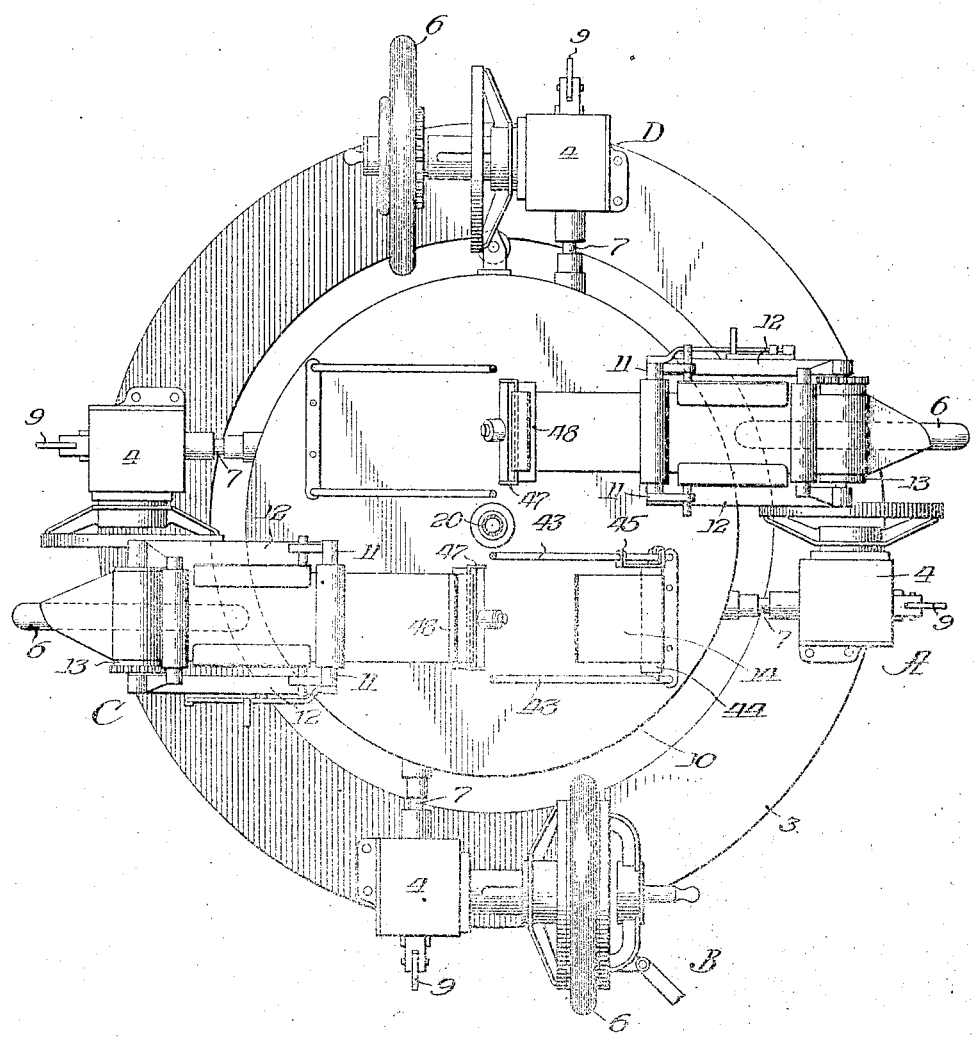
Fig. 3 is a plan view of as much of the apparatus as lies below the line 3—3 of Fig. 1.
Figure 4:
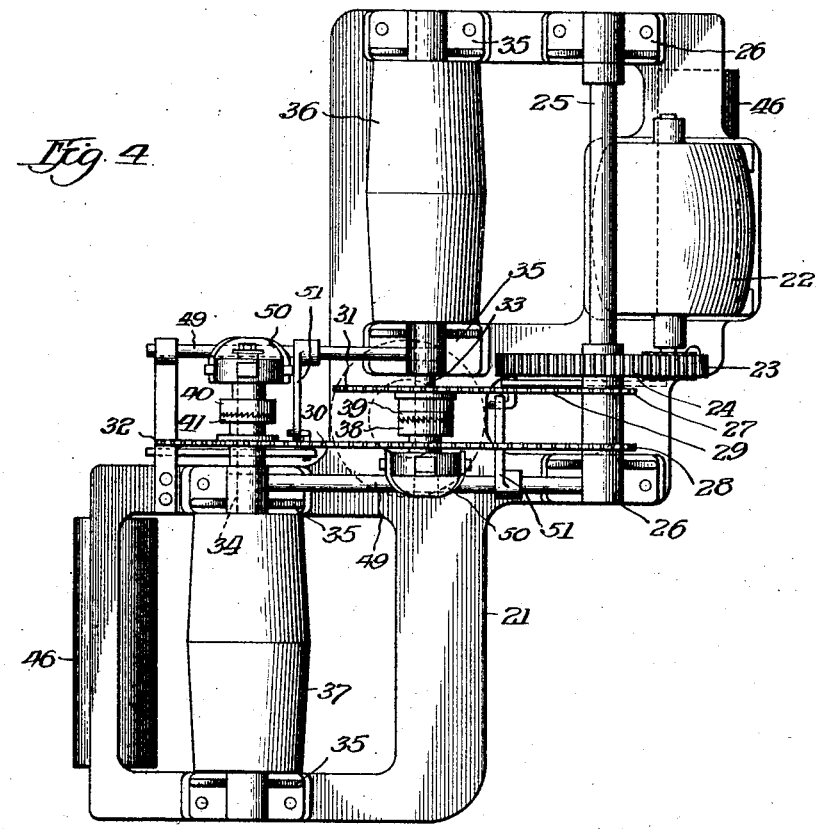
Fig. 4 is a plan view of the upper part of the apparatus or the fabric feeding devices.
Figure 5:
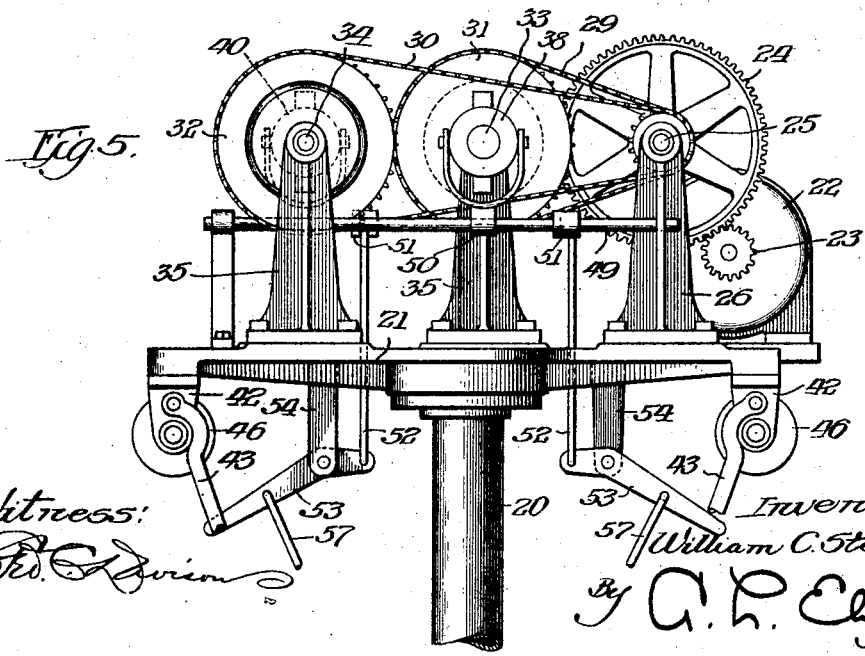
Fig. 5 is a side elevation of the parts shown in Fig. 4.

Referring to Fig. 3, the several positions are marked A, B, C, and D, being, respectively, the positions in which the first or under-bead layers are applied and shaped to the core, the bead applying position, the position at which the over bead layers are applied and shaped to the core, and the position at which the carcass is trimmed, inspected, the core with the finished tire carcass removed and a new one substituted in its place. While the number of operations may be increased or diminished, it is preferable to have the two fabric applying stations separated, as the underbead and overbead layers are of different widths, and it is easy to bring the plies of different widths to separated points on the machine. This is not essential to practice the invention as the fabric of differing widths may be led from separated sources to a single building point.

The turntable 3 may be rotated step by step in any preferred manner, not described, and the core shafts are rotated by jack shafts 7 on the stanchions 4 adapted to be connected or disconnected from the driving source through clutches 8 operated by levers 9. The portions of the clutches 8 which are mounted on the base 1 are driven from any source of power and further description of the driving mechanism is not necessary as it is fully gone into in my application identified above.

In the center of base 1 and rising above the turntable is a central platform or table 10 on the upper surface of which are two pairs of standards 11, each pair being in line with the cores in A or C positions. To the lower part of each pair of standards are pivotally connected pairs of swinging arms 12 in the outer ends of which are mounted stretching rollers 13 which are retarded so as to move at a slower speed than the surface speed of the core, in any well-known manner.

The usual practice in the art is to cut strips at an angle of 45° and to connect said strips end to end to form a length of material from which the tire is built up. The usual practice has been to form the strips into lengths which have been wound between liners and then placed in the machine. In place of forming the fabric into rolls, it is led as built up directly to the tire machine and passed into and through the stretching rolls onto the core, being formed into a loop on its way, the loop being designed to hold sufficient fabric for one operation of the tire core.

Figure 6:
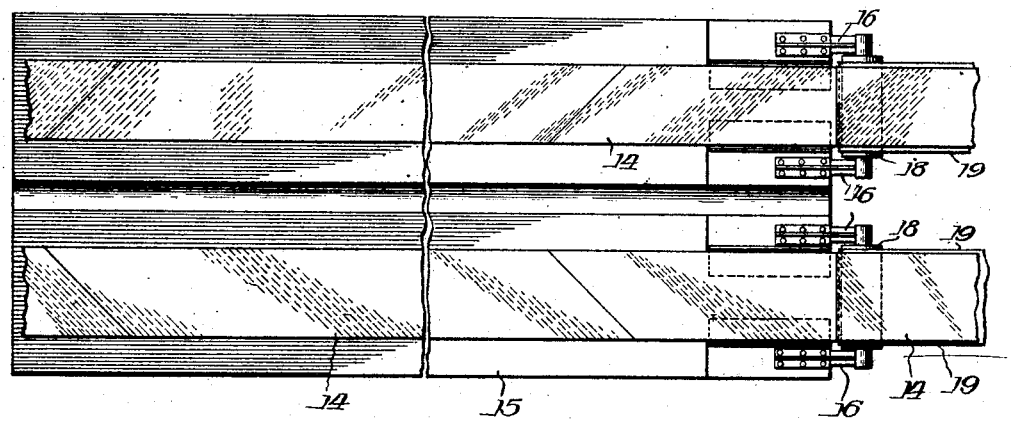
Fig. 6 is a plan view of the fabric assembling tables.
Figure 7:
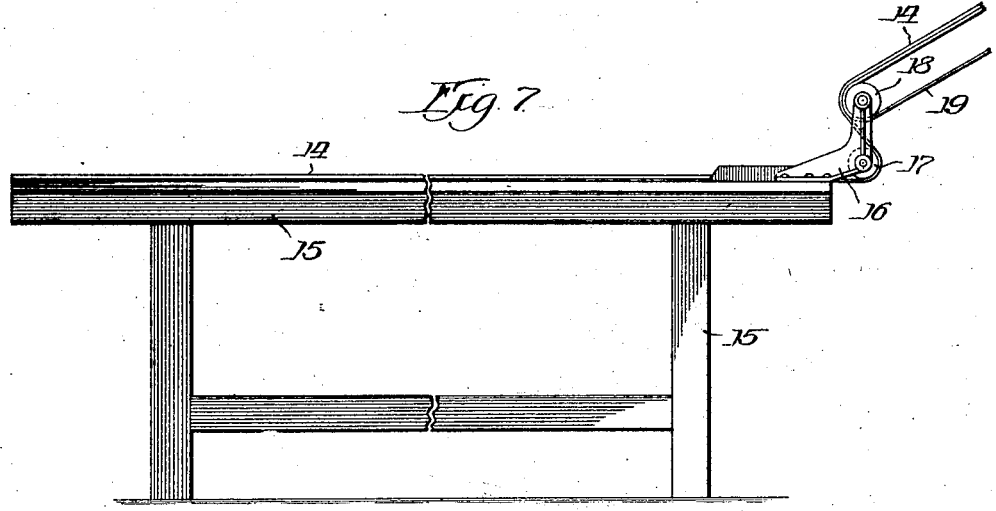
Fig. 7 is a side elevation of a table.

Referring to Figs. 6 and 7, the strips of bias cut fabric are shown and the manner in which they are joined together to form a continuous length of fabric, the fabric being designated by the numeral 14, the tables on which they are spliced being designated by the numeral 15. At the ends of the table nearest the tire building machine are supported brackets 16 in the lower end of which are supported rolls 17 around which the spliced fabric passes. In the upper ends of the brackets are carried pulleys 18 which support conveyor belts 19 on which the fabric is received on leaving the tables 15. It will be noted that one of the strips of fabric is narrower than the other, the narrower strip being intended for the under bead plies and the wider for the overbead plies.

From the center of the platform 10 rises a pillar or post 20 on the upper end of which is supported a shelf or platform 21. At one side of the platform is mounted a motor 22, the pinion 23 of which is in mesh with a gear 24 on a transverse shaft 25 supported in brackets 26 rising from the platform. On the shaft 25 are carried two sprockets 27 and 28 over which run chains 29 and 30 to sprockets 31 and 32, loose on shafts 33 and 34, respectively. These shafts are supported in brackets 35 rising from the table 21 and carry pulleys 36 and 37 which carry the belt conveyors 19 for the narrow and wide plies respectively, the narrow plies going to the core in position A and the wide plies to the core in position C.

On the shaft 33 is carried a shiftable but non-rotatable clutch member 38 which is designed to engage with a clutch face 39 on the sprocket 31. On the shaft 34 is carried a similarly mounted clutch member 40, engageable with a clutch face 41 on the sprocket 32.

Depending from the two sides of the platform are brackets 42, to each of which are secured diagonal guide rods 43, the lower ends of which extend to and are secured on the central table 10. On these rods are slidably mounted dance rolls or idlers 44 by means of carriages 45.

Each length of fabric as it leaves the assembling table is conveyed by the belt 19 to the top of the platform where it passes over the pulley 36 or 37. It then passes down under the roller 44 and back over a roller 46 in the brackets 42 and then through a pivoted guide plate 47 under a roller 48 and to the stretching or tensioning rollers 13. The loop formed by the roller 44 is sufficient to store up fabric for the required number of rotations of the core for a single operation.

Supported above the platform 21 are a pair of rocking rods 49, to each of which is secured a spanner arm 50 connected to a shifting clutch member on either shaft 33 or 34. Each of the rockers 49 carries an arm 51 from which depends a link 52, the lower end of which is pivoted to a lever 53, fulcrumed to a bracket 54 depending from the underside of the shelf 21.

The tail end of the lever extends within the path of the carriage 45 and is arranged to be struck and rocked by the carriage when the roll 44 is at the upper limit of its movement at which time the loop is exhausted. The arrangement is such that an upward movement of the tail end of the lever 53 connects the two parts of the clutch and the appropriate pulley 36 or 37 is rotated to actuate the conveyor and deliver fabric to the loop or storage supply.

In order to stop the feeding of the fabric when the loop is filled, there projects in the path of the carriage 45 at the lower limit of its movement, the tail end of a lever 55, which is pivoted to the central platform 10 at 56. The lever 55 is connected to the lever 53 by a rod 57.

The action of the apparatus will be briefly described:

The operators attach the leading end of the fabric 14 to the core in A or C position, the narrow ply at A and the wide at C. The clutch 7 is now connected by manipulation of the handle 9 and the core is rotated to draw the fabric thereover. The fabric, which is held in a loop or storage supply as shown at the right in Fig. 1 is now drawn out, the roller rising along the rods 43. Enough fabric is stored up in the loop to supply the usual demand for a single operation of the core. When the core has been covered to the extent desired, by one or more revolutions of the core, the fabric is severed between the last tension roll 13 and the core.

When the roll 44 and its carriage are at the upper end of their travel, the carriage strikes the lever 53 and rocks the rod 49 to clutch the motor to the appropriate pulley shaft, whereby the fabric is fed to the storage loop. As the roller descends on the rods, it strikes the lever 55 at the lower end of the loop and the rod 49 is thrown to release the clutch. In Fig. 1 the roller 44 is shown at the lower limit of its movement for the left hand core and at the upper limit of its movement for the right hand core.

The machine thus automatically supplies itself with enough fabric without attention of the machine operator, it only being necessary for the assembler to keep enough fabric spliced on the tables 15 to supply the conveyor when called upon. It will be readily seen that the apparatus herein shown is an advance over the prior practice in that a storage supply of fabric is always maintained in the view of the operation and fresh fabric is automatically supplied from the assembling table to the machine. The rotation of the core causes the dance roller to rise, which in turn actuates the conveyor belt through the shiftable clutch. The core thus controls its own feeding mechanism.

Changes and modifications may be made without departing from the spirit of the invention or sacrificing any of its benefits.

I claim:

1. In combination, a tire making machine, a fabric assembling table, a conveyor for the assembled fabric and loop forming mechanism between the table and the tire making machine, and means controlled by the loop forming mechanism for operating the conveyor.

2. In combination, a tire making machine, a fabric assembling table, a rotating core on said machine, a conveyor for carrying fabric from the table to the machine, and means actuated by the rotation of the core for starting the feeding movement of the conveyor.

3. In combination, a tire making machine, a rotating core on said machine, a fabric assembling table, a conveyor for transporting the fabric to the machine, an intermediate storage supply at the machine, and means controlled by the amount of fabric in said supply for governing the operation of the conveyor.

4. In combination, a tire making machine, a rotating core on said machine, a fabric assembling table, a conveyor for transporting the fabric from the table to the machine, a vertically movable roller for forming a loop in the fabric, and means adapted to be actuated by the roller in its upper and lower positions for starting or stopping the conveyor.

5. In combination, a tire making machine and a fabric assembling table, means to conduct the length of tire fabric from the table to the machine, comprising a belt conveyor, and mechanism for forming a storage supply of fabric between the assembling table and the point at which the tire is fabricated.

6. In combination, a tire making machine comprising a core carrying and rotating support, a fabric assembling table, means to conduct the length of tire fabric from the table to the machine, comprising a conveyor to conduct and support the fabric, and a device for forming a storage supply of fabric between the assembling table and the point at which the tire is fabricated.

7. In combination, a tire making machine comprising a core carrying and rotating support, a fabric assembling table, means to conduct the length of tire fabric from the table to the machine, comprising a conveyor to conduct and support the fabric, a device for forming a storage supply of fabric, and means operating through the amount of fabric in storage to control the action of said conveyor.

8. In combination, a tire making machine and a fabric assembling table, a rotating core on said machine, a conveyor to conduct and support the length of tire fabric from the table to this conveyor, and means actuated upon rotation of the core for starting or stopping said conveyor.

9. In a tire making machine, a core, means to rotate the core upon its axis, means to bodily move the core into two positions, means for conducting the tire fabric to the core in its two positions, comprising conveyors and common means for actuating the conveyors controlled by the requirements for fabric in each position of the core.

10. In combination, a tire making machine, a fabric assembling table, power actuated means for drawing the fabric from the assembling table, mechanism for forming a storage supply of fabric between the assembling table and the tire making machine, said power actuated means being controlled by the amount of fabric in the storage supply.

11. In a tire making machine, an assembling table, a conveyor to conduct tire fabric from the table and deliver it to the tire making machine, a motor, and a clutch between the motor and the conveyor, said clutch being operated by the amount of fabric between the conveyor, and the tire making machine.

12. A tire making machine, a platform above the tire machine, an assembly table for the tire fabric, a conveyor leading from the table to the platform, loop forming mechanism below the platform, a power actuated device on the platform for operating the conveyor and means operated by the loop forming mechanism to render said actuated device operative or inoperative.

13. A tire making machine, an assembling table in combination, a conveyor for conducting the fabric from the assembling table to the tire making machine, a power device, connections between the power device and the conveyor, a clutch in said connection, a loop forming roller between the end of the conveyor and the tire making machine and levers to actuate said clutch operated by the said roller.

14. A tire making machine having in combination, a source of fabric supply, a core, means for feeding the fabric from the supply source to the core, said means including a festooning device, and means controlled by the amount of fabric in the festoon for operating the feeding means.

15. A tire making machine having in combination, a source of fabric supply, a rotating core, a festooning device between the supply source and the core including a vertically movable roller, and automatic means controlled by the roller for feeding the fabric to the festoon.

16. A tire making machine having in combination, a source of fabric supply, a core, power operated means for feeding the fabric from the supply source into the machine, a festooning device between the feeding means, and means controlled by the amount of fabric in the festoon for governing the operation of the feeding means.

17. A tire making machine having in combination, a source of fabric supply, a rotating core, means for feeding the fabric from the source of supply into the machine, a vertically movable roller for forming a loop in the fabric, and means actuated by said roller for starting and stopping the feeding means.

18. A tire making machine having in combination, a source of fabric supply, a rotating core, power actuated fabric feeding means, means for forming a storage supply between the feeding means and the core, said latter means including a vertically movable roller, and means controlled by the rotation of the core for governing the operation of the feeding means.

19. A tire making machine having in combination, a source of fabric supply, a core, power actuated means for feeding the fabric into the machine, and a festooning device between the feeding means and the core, said feeding means being controlled by the amount of fabric within the festoon.

20. A tire making machine having in combination, a source of fabric supply, a core, fabric feeding means, means for actuating the feeding means, clutch connection between the feeding means and the actuating means, a festooning device between the source of supply and the core, and means controlled by the amount of fabric in the festoon for automatically connecting and disconnecting the said clutch.

21. A tire making machine having in combination, two sources of fabric supply, a plurality of rotating cores, means for feeding the fabric to the cores, a motor, clutch connection from the motor to the feeding means, and means controlled by the rotation of the core for actuating said clutches to operate the feeding means.

22. A tire making machine having in combination, a plurality of cores, a source of fabric supply for each of said cores, power actuated means for feeding the fabric to the cores, and means controlled by the rotation of the cores for controlling the operation of the feeding means.

WILLIAM C. STEVENS.